(12) United States Patent
Wang

(10) Patent No.: US 10,430,826 B1
(45) Date of Patent: *Oct. 1, 2019

(54) CONVERSION TIMING PREDICTION FOR NETWORKED ADVERTISING

(71) Applicant: Quantcast Corporation, San Francisco, CA (US)

(72) Inventor: Yongjia Wang, Albany, CA (US)

(73) Assignee: Quantcast, San Francisco, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 15/413,645

(22) Filed: Jan. 24, 2017

Related U.S. Application Data

(63) Continuation of application No. 13/835,962, filed on Mar. 15, 2013, now Pat. No. 9,589,278.

(51) Int. Cl.
  *G06Q 30/02* (2012.01)
(52) U.S. Cl.
  CPC ..... *G06Q 30/0246* (2013.01); *G06Q 30/0264* (2013.01); *G06Q 30/0275* (2013.01); *G06Q 30/0277* (2013.01)
(58) Field of Classification Search
  CPC .......... G06Q 30/0246; G06Q 30/0264; G06Q 30/0275; G06Q 30/0277
  USPC ....................................................... 705/14.35
  See application file for complete search history.

(56) References Cited

U.S. PATENT DOCUMENTS

| 7,386,517 B1 * | 6/2008 | Donner ................. | G06Q 10/02 705/14.14 |
| 2002/0062245 A1 * | 5/2002 | Niu ........................ | G06O 30/02 705/14.51 |
| 2008/0154761 A1 * | 6/2008 | Flake ..................... | G06Q 30/02 705/37 |
| 2008/0306816 A1 * | 12/2008 | Matthys ................ | G06Q 30/02 705/14.69 |

(Continued)

OTHER PUBLICATIONS

United States Office Action, U.S. Appl. No. 13/835,962, dated Oct. 7, 2015, 25 pages.

(Continued)

*Primary Examiner* — Luis A Brown
*Assistant Examiner* — Robert C Johnson
(74) *Attorney, Agent, or Firm* — Robin W. Reasoner; Andrea Wheeler

(57) ABSTRACT

A computer-implemented method for conversion timing inference. A conversion timing model is model is configured to predict a likelihood of conversion based on an entity's elapsed time since a qualified entry event. The conversion timing model is constructed based on a distribution of the conversion timespans of converters. Each conversion timespan describes a length of time between a qualified entry event and a conversion event for a converted entity. A notification of an opportunity to expose a candidate entity to networked content is received and the likelihood of conversion for the candidate entity is determined by: determining an elapsed time since a qualified entry event for the candidate entity and applying the conversion timing model to the (Continued)

400

A conversion timing model is constructed at a conversion timing system 100 based on a distribution of conversion timespans (Step 410)

A notification of an opportunity to expose a candidate entity to networked content is received (Step 420).

An elapsed time since a qualified entry event for the candidate entity is identified (Step 430).

A likelihood of conversion for the candidate entity is determined by applying the conversion timing model to the elapsed time since a qualified entry event for the candidate entity (Step 440).

A response to the notification is prepared based on the likelihood of conversion for the candidate entity (Step 450).

elapsed time. A response to the notification based on the likelihood of conversion for the candidate entity is prepared. Timely responses may include the selection of customized content, customized advertising content or bid values.

20 Claims, 8 Drawing Sheets

(56) References Cited

U.S. PATENT DOCUMENTS

| | | | | |
|---|---|---|---|---|
| 2011/0258049 A1* | 10/2011 | Ramer | ................... | G06O 30/02 705/14.66 |
| 2012/0166267 A1* | 6/2012 | Beatty | ................ | G06Q 30/0247 705/14.21 |

OTHER PUBLICATIONS

United States Office Action, U.S. Appl. No. 13/835,962, dated Mar. 13, 2015, 20 pages.

* cited by examiner

400

A conversion timing model is constructed at a conversion timing system 100 based on a distribution of conversion timespans (Step 410)

A notification of an opportunity to expose a candidate entity to networked content is received (Step 420).

An elapsed time since a qualified entry event for the candidate entity is identified (Step 430).

A likelihood of conversion for the candidate entity is determined by applying the conversion timing model to the elapsed time since a qualified entry event for the candidate entity (Step 440).

A response to the notification is prepared based on the likelihood of conversion for the candidate entity (Step 450).

FIG. 4

| Funnel State identifier | Event A = visit vendor's home page | Event B = check availability of sizes for a product on vendor's website | Event C = visit a blog on the vendor's website |
|---|---|---|---|
| ABC | + | + | + |
| AB | + | + | - |
| AC | + | - | + |
| A | + | - | - |
| BC | - | + | + |
| B | - | + | - |
| C | - | - | + |

FIG. 5a

| Funnel State ID | Event A = visit vendor's home page | Event B = check availability of sizes for a product on vendor's website | Event C = visit a blog on the vendor's website |
|---|---|---|---|
| A->B->C | 1 | 2 | 3 |
| A->C->B | 1 | 3 | 2 |
| B->C->A | 3 | 1 | 2 |
| B->A->C | 2 | 1 | 3 |
| C->A->B | 2 | 3 | 1 |
| C->B->A | 3 | 2 | 1 |
| A->B | 1 | 2 | - |
| B->A | 2 | 1 | - |
| A->C | 1 | - | 2 |
| C->A | 2 | - | 1 |
| A | 1 | - | - |
| B->C | - | 1 | 2 |
| C->B | - | 2 | 1 |
| B | - | 1 | - |
| C | - | - | 1 |

FIG. 5b

Converted entities are sorted into funnel states based on the definition of an entry event for each funnel state (Step 610).

A conversion timing model is constructed at a conversion timing system 100 for each funnel state based on the distribution of conversion timespans for the funnel state's converted entities (Step 620).

A notification of an opportunity to expose a candidate entity to networked content is received (Step 630).

The candidate entity is matched with a funnel stage (Step 640).

An elapsed time since a qualified entry event for the candidate entity is identified (Step 650).

A likelihood of conversion for the candidate entity is determined by applying the matching funnel state conversion timing model to the elapsed time (Step 660).

A response to the notification is prepared based on the likelihood of conversion for the candidate entity (Step 670).

FIG. 6

CONVERSION TIMING PREDICTION FOR NETWORKED ADVERTISING

CROSS-REFERENCE TO RELATED APPLICATIONS

This application is a continuation of U.S. Non-Provisional application Ser. No. 13/835,962 entitled "Conversion Timing Prediction for Networked Advertising" by Yongjia Wang, filed on Mar. 15, 2013, which is hereby incorporated by reference in its entirety.

BACKGROUND

Field of Invention

The invention relates to providing a timely and customized response to the notification of an opportunity to expose a visitor to networked content by predicting the conversion timing of the visitor.

Description of Related Art

Online advertisements can help drive a prospective customer through a conversion funnel. In many cases, advertisers will engage one or more parties, such as media partners, demand side platform operators and intention marketing platform operators to help drive conversions with networked advertising exposures. A party may be monitored, paid or evaluated based on the number of conversions which are attributed to their operations.

It is not unusual for a prospective customer to be exposed to multiple networked advertisements before they convert. Presumably, some of these exposures contribute to driving conversions, while others don't. Many attribution schemes are related to the timing of an advertising exposure, such as a "last touch" attribution scheme, which attributes credit to the advertisement which most recently preceded the customer's conversion. Assessing the likelihood of a prospective customer's conversion is useful for parties working towards driving conversions. Additionally, it would be advantageous for a party which is compensated based on an attribution scheme which is related to the timing of an advertising exposure, to estimate the conversion timing for a prospective customer so that they can take proper, timely action, such as setting an appropriate bid price or formatting a creative which is suitable for the prospective customer's funnel stage.

Online vendors would also benefit from the ability to rapidly understand the conversion timing of a prospective customer which is engaged on their website in order to provide custom content or customized offers which may be tuned to the prospective customer's likely funnel stage.

What is needed is a way to model conversion timing for a prospective customer, so parties can take appropriate, timely action.

SUMMARY

Embodiments of the invention provide a system, method, and computer-readable medium for modeling conversion timing. In an embodiment, a conversion timing system constructs a conversion timing model based on a distribution of conversion timespans. Each conversion timespan describes a length of time between a qualified entry event and a conversion event for a converted entity. A qualified entry event is an event which indicates a prospective customer's entry into the advertiser's funnel, such as a visit to an advertiser's web site or the execution of a branded search. The conversion timing system receives a notification of an opportunity to expose a candidate entity to networked content, such as a bid request from a real time bidding (RTB) exchange or a notification that a prospective customer has requested content from a vendor's website. The conversion timing system determines an elapsed time since a qualified entry event for the candidate entity. A response to the notification is prepared by applying the conversion timing model to the candidate entity's elapsed time, before the opportunity to expose the candidate entity to networked content is consumed. For example, a response may comprise the selection of a bid price, an advertising creative, customized content or combinations thereof.

In an embodiment, the conversion timing system configures the conversion model to predict a likelihood of conversion within a time window based on a prospective customer's elapsed time.

In an embodiment, the conversion timing system fits the distribution of conversion timespans with a gamma mixture model. A gamma mixture model may be fitted with a pre-configured number of conversion modes or fitted with a number of conversion modes received from an external resource. In some cases, multiple gamma mixture models may be fitted using different number of conversion modes, different weights per conversion mode or both, and the model with the best fit may be selected for operation. Advantageously, the number of conversion modes and the weightings per conversion mode which provide the best fit may provide insight to the advertiser by characterizing the number of different types of converters and the relative populations sizes of the different types of converters.

In some embodiments, the conversion timing system can construct a conversion timing model parameterized by one or more features such as: features characterizing a converted entity. Advantageously, the resulting parameterized conversion timing model can be used to make predictions related to candidate entities with previously unseen combinations of features.

BRIEF DESCRIPTION OF DRAWINGS

FIG. 4 is a flow chart illustrating an example of a method for conversion timing inference, according to an embodiment of the invention;

FIG. 5a is a table illustrating seven funnel states for a funnel which is modeled with three funnel events where the order of the funnel events in an entity's history is not considered;

FIG. 5B is a table illustrating fifteen funnel states for a funnel which is modeled with three funnel events where the order of the funnel events in an entity's history is considered; and FIG. 6 is a flow chart illustrating an example of a method for conversion timing inference, according to an embodiment of the invention.

DETAILED DESCRIPTION OF THE INVENTION

Figure 1:
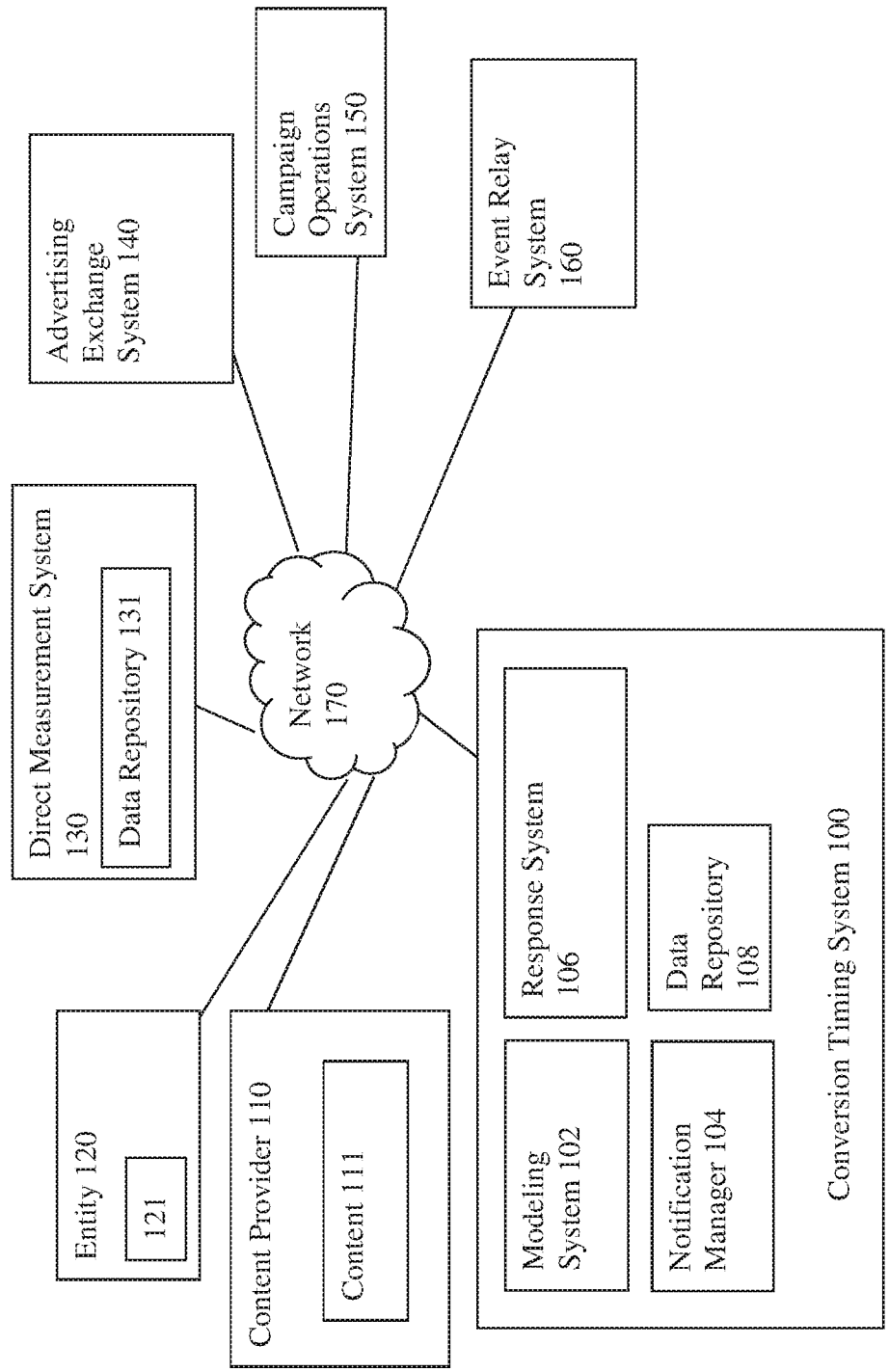
FIG. 1 illustrates an example computing environment in accordance with an embodiment.

FIG. 1 is a high-level block diagram of a computing environment for conversion timing prediction in accordance with an embodiment of the invention. In particular, the conversion timing system 100 can be used to estimate the likelihood of conversion for a candidate entity based on the elapsed time since the candidate entity's entry into a conversion funnel, as marked by a qualified entry event. A conversion funnel is described with a conversion event and the important entry point (or points), such as a visit to an advertiser's home page, along with the limitations which can be used to qualify valid entry events.

FIG. 1 illustrates an example computing environment in accordance with an embodiment. As shown in FIG. 1, the conversion timing system 100, a content provider 110, an entity 120, a direct measurement system 130, an advertising exchange system 140, a campaign operations system 150, and an event relay system 160. These elements are connected by a communications network 170, such as a local area network, a wide area network, a wireless network, an intranet, a cable network, a satellite network, a cellular phone network, an optical network, the Internet or combinations thereof.

Content provider 110 is a media channel which provides networked content 111 over the communications network 170 to an entity 120. Examples of content providers 110 can include web site operators, online vendors and cable television operators. In some cases, it can be useful to consider a content provider as comprising multiple content providers. For example, a content provider such as a portal website operator can provide multiple websites, such as localized versions of the same website. Similarly, a clothing vendor's website may comprise multiple sub-sites or sections such as a women's clothing website, a men's clothing website and a children's clothing website. Examples of networked content 111 can include, but are not limited to, a webpage, advertising content, a portion of an online video clip, a portion of a networked television program, a portion of a cable television program, a portion of a satellite television program, a portion of an Internet Protocol (IP) television program, a portion of an online audio clip, the results of a keyword search from an online search engine, the results of a request for directions from an online mapping service, interfaces for making online purchases and interfaces for checking a credit card account balance. In some examples, networked content 111 can be provided over the communications network 170, based on a request to content provider 110; in some examples, content provider 110 can push the networked content 111 over the communications network 170 to an entity 120. Although only one content provider 110 is shown in FIG. 1 for clarity, any number of content providers may be connected to the communications network 170.

In various embodiments, entity 120 accesses networked content 111 from content provider 110 over the communications network 170. Examples of entities can include end-users, consumers, customers, software installations or hardware devices used to access content or combinations thereof. Software installations can include a web browser instance, video viewer instance or set-top box software residing on a hardware device. A hardware device can comprise a computer, personal digital assistant (PDA), cell phone or set-top unit (STU) such as a STU used in conjunction with cable television service. A consumer is a person or group of people who access content. In some cases, an entity 120 can comprise a combination of entities which are logically grouped together to represent individuals, households or groups of individuals who access networked content 111 over a communications network 170. In some cases, an entity which receives networked content 111, such as a web page, from a content provider 110, such as a website, can also be called a visitor to content provider 110. Although only one entity 120 is shown in FIG. 1 for clarity, any number of entities may be connected to the communications network 170.

As shown in the embodiment of FIG. 1, entity 120 is associated with an entity identifier 121. For example, a hardware device identifier such as a Media Access Control Address (MAC address) can be stored on a device associated with the entity 120. A software identifier such as a cookie value can be stored locally. In an embodiment, identifiers used to identify entities can be wholly or partially composed remotely from an entity or a device associated with the entity. In an embodiment, identifiers used to identify entities can be wholly or partly stored remotely from an entity or a device associated with the entity. In some cases, an entity can have multiple identifiers, such as multiple first party cookies and multiple third party cookies, which can be used to identify the entity to various systems.

A content provider 110 may be integrated with a measurement system, such as direct measurement system 130. A direct measurement system 130 collects information for an entity 120 in conjunction with an identifier such as entity identifier 121. When an entity 120 requests networked content 111 from a content provider 110, such as a request from a web browser operating on a personal computer to display the content of a web page of an online publisher, the content provider 110 can re-direct the entity 120 to submit a pixel request to the direct measurement system 130. Based on the pixel request, and optional subsequent actions, the direct measurement system 130 can collect information from the entity 120 and information associated with the entity 120. Information is collected in conjunction with an identifier, such as entity identifier 121, in order to enable the maintenance of a coherent body of information, such as event histories which document measurable events such as the consumption of content, partial event histories, event history scores, a portion of an event history consumption history, an event history characterization, an event history digest, or combinations thereof, for an entity over time.

Information can include a consumption history for an entity 120, such as records of the execution of measurable events, consumption events and attribute values. In some cases, the context of an event, such as the duration and quality of the consumption event, can be part of the event history. In an example, information associated with the hardware configuration, software configuration or volume settings during the delivery of an audio advertisement can be collected and stored as part of the event history. In some cases, the event history associated with an entity 120 can describe interactions with the content, such as pausing an online video clip.

In some cases, the event history can document the viewability or accessibility of content. For example, in some cases, content may be delivered to an entity, such as a browser, but not viewed by the end-user operating the browser because the end-user quickly navigated away from the content before it finished loading. In other examples, viewability may be compromised because content may be obscured by an item displayed on a monitor, such as a window; accessibility of the audio portion of multimedia content may be compromised because the volume was muted through hardware or software controls.

Attribute values can comprise known, collected, received, cross-referenced, inferred, estimated, processed and calculated information related to an entity 120 which may or may not be part of an event history. In some cases, attribute values can be derived from an event history. The estimated household size associated with an entity 120 and the average household income for the zip code associated with an entity 120 are examples of attribute values. In some cases, attribute values can be assessed or described using probabilities. For example, an attribute value can reflect that there is a 90% chance that the household income related to an entity earns between $75,000 and $100,000 per year. In some cases, information can be received and processed into a processed attribute value. For example, attribute values can comprise information which has been statistically obfuscated to address privacy concerns.

In an embodiment, information collected by the direct measurement system 130 is stored in a data repository 131, such as a database. In some cases, information collected by the direct measurement system 130 can be processed before it is stored in data repository 131. In some embodiments, histories or information related to entities may be received or collected by systems other than direct measurement systems.

An advertising exposure results from the delivery of advertising content over a network 170 to an entity 120. Advertising exposures comprise content such as textual, graphical, video, audio or multi-media content which may be embedded in or delivered in conjunction with web pages, networked games, multi-media presentations, video content, audio content or combinations thereof. An advertising exposure can be a simple exposure which does not require or enable end-user interaction. However, some examples of advertising exposures can enable end-user interaction, such as an online advertisement which allows an end-user to click-through to the advertiser's web page; similarly, an advertising exposure such as a paid search result can enable end-user interaction, such as a click-through to an advertiser's website.

An advertising exchange, such as advertising exchange system 140, is an electronic marketplace for buying and selling advertising impressions, such as the opportunity to expose an entity to advertising content delivered over a network. In an example, a real time bidding (RTB) advertising exchange can support the rapid auction of advertising impressions as they become available. For example, the advertising exchange system 140 can be notified by a content provider 110 after an entity 120 requests networked content 111 from the content provider 110 and an opportunity to display an advertising impression to that entity 120 becomes available. The advertising exchange system 140 can provide a stream of bid opportunity records with each bid opportunity record describing the opportunity to expose an entity to advertising content which is available for bidding. For example, the advertising exchange may provide information in a bid opportunity record which describes the advertising impression, such as the size of the advertisement, the position of the advertising impression with respect to a web page, the web site location of the advertising impression, the context or topic of the display webpage associated with the advertising impression. The entity which is the intended recipient of the advertising impression may be described in the bid opportunity record with information, such as the local time of day for that entity and an identifier. An advertising exchange system 140 receives bids related to a bid opportunity, selects the winning bid and enables the winning bidder to send the advertising content to the entity 120. In some cases, an advertising server system (not shown) may be integrated into the process, and the advertising content may be served to the entity 120 by the advertising server system on behalf of the winning bidder. For example, an advertising server system can comprise a web server for storing online advertising content and delivering the online advertising content to entities, such as website visitors, through a client device. A local advertising server system may only provide services for a single content provider, whereas third-party advertising server systems can provide services in conjunction with multiple content providers.

A campaign operations system 150 operates an advertising campaign. In some cases, a campaign may be operated on behalf of an advertiser by a party, such as a media partner. A demand side platform (DSP) is an example of a campaign operation system that can operate multiple advertising campaigns on behalf of multiple advertisers. In an example, a campaign operations system 150 can be integrated with one or more advertising exchange systems 140, and receive a stream of bid opportunity records. The campaign operation system can assess a bid opportunity to determine the suitability of the bid opportunity for an advertising campaign. In some cases, assessing the suitability of a bid opportunity can comprise assessing a bid opportunity with respect to an advertising campaign to reflect a likelihood of conversion by categorizing, scoring or rating the bid opportunity, the entity associated with the bid opportunity or both. In some cases, a party may provide a campaign operation system with information which can be used to rate, select or avoid entities, bid opportunities or both such as a ranked or unranked list of entities which are good candidates for conversion for a campaign; similarly, a party may provide a campaign operation system with a list of entities which should be avoided for a campaign (a black list).

In an embodiment, conversion timing system 100 comprises a modeling system 102, a notification manager 104 and a response system 106. A conversion timing system 100 constructs a conversion timing model based on a distribution of conversion timespans. The conversion timespans describe a length of time between a qualified entry event and a conversion event for a converted entity. In some cases, the conversion timing system may receive a set of conversion timespans from an external resource, such as, but not limited to, a direct measurement system. In some cases, the conversion timing system may collect or receive a set of histories for converted entities and determine the conversion timespans by examining the histories in light of definitions of a qualified entry event and a conversion event. In some cases, the conversion timing system may receive measurements corresponding to timestamps for entry events, qualified entry events, conversion events or combinations thereof from an external resource.

The conversion timing system configures the conversion timing model to predict a likelihood of conversion for an entity based on an elapsed time since the entity's qualified entry event. An entry event indicates that an entity has entered an advertiser's funnel. A qualified entry event meets one or more entry event criteria. Entry event criteria may be received from an external resource such as an advertiser, a vendor or content provider. Entry event criteria can characterize the event venue. For example, entry event criteria can describe one or more valid network addresses, URLs (Uniform Resource Locators) channels, web pages or domains which can qualify a media consumption event as an entry event, such as a list of partial or complete network addresses or URLs (Uniform Resource Locators) for the advertiser's home page, a product description page and the home web page for the advertiser's authorized re-seller. An entry event criterion can establish quality requirements such as minimum viewability requirements, minimum residence times, requirements related to the device display resolution or combinations thereof. An entry event criterion can characterize the entities related to the entry event and may qualify desirable entities, disqualify undesirable entities or both. For example, entry events may be qualified or disqualified based on the related entity's geographic location, DMA or domain.

In some cases, an entity may be associated with more than one qualified entry event; in this case, a consistent method for determining the elapsed time can be established and applied consistently. For example, the elapsed time can be the time elapsed since the most recent qualified entry event or the time elapsed since the oldest qualified entry event. In another example, a method for determining the most important qualified entry event may be established and the elapsed time can be the time elapsed since the most important qualified entry event. Similarly, a converter may be associated with more than one qualified entry event and a consistent method for determining the conversion timespan should be established and applied consistently. For example, the conversion timespan can describe the length of time between the newest qualified entry event and the conversion event or the length of time between the oldest qualified entry event and the conversion event. In another example, a method for determining the most important qualified entry event may be established and the conversion timespan can be the length of time between the most important qualified entry event and the conversion event.

An entry event may be the direct result of an end-user's interaction with advertising content; for example, an end-user may click-through advertising content which directs their browser to an advertiser's home page. In another example, an end-user can execute a search through a search engine, and select a paid placement result or an organic search result presented by the search engine, resulting in a visit to the home page of an advertiser.

Entry event criteria can be configured so that an entry event is not required to be the direct result of user interaction with content such as advertising content, search results or paid search results. For example, an end-user may directly type a partial or complete URL string into a web page browser to arrive at an advertiser's home page; in this case, the entry event is unreferred. An unreferred entry event is not the direct result of end-user interaction with content such as advertising content, search results or paid search results. In some embodiments, more than one qualified entry event may be configured per funnel.

In an example, an entry event may be characterized as the execution of a branded search. A branded search indicates interest in a specific brand by including keywords such as an advertiser's name or trademark; a search using the keyword phrase "women's lace-up BrandX Shoes sale" is an example of a branded search because it includes the term "BrandX" and is not a relevant search. Another example of a branded search is an online image search with input comprising an image including an advertiser's product or logo.

A conversion event for a funnel is an event which characterizes the vendor's or advertiser's desired goal, such as an online purchase, the completion of an online registration form or the submission of an online form requesting a price quote. In some cases, an advertiser may be interested in driving new prospective customers to their website; in this case, the conversion event can be a prospective customer's first visit to the advertiser's website. Similarly, a content provider may be interested in increasing their engagement with their audience and the conversion event can be an entity's fifth visit to the content provider's website this month.

Examples of networked conversion events include online transactions such as online purchases. However, some embodiments of the invention support conversion events involving off-network activities which are reported over a network to the conversion timing system, such as a purchase at a brick-and-mortar store using a printed coupon downloaded from a networked location or a cell phone coupon associable with the customer. In an example, an integrated point-of-sale system can detect the use of the paper or electronic coupon to complete a purchase, and provides notification of the conversion event over the network to the conversion timing system; in some cases, a network or a system, such as an event relay system 160 can relay notification of a conversion event to a networked system, such as, but not limited to, a conversion timing system 100, a content provider 110, a direct measurement system 130 and a campaign operations system 150.

Similarly, examples of networked entry events include receiving media content over a network, such as visiting an advertiser's home page. However, some embodiments of the invention support entry events comprising events which do not require receiving media content over a network, but are still reported over a network to the conversion timing system. For example, some customer loyalty cards may require online activation, providing an opportunity to anonymously link a customer loyalty card to an entity's media consumption history. For example, the customer loyalty card account number could be subjected to a one-way hash during registration and the hash value could be stored in conjunction with the entity's media consumption history without the customer loyalty card account number, preserving the privacy of the customer. In this case, an entry event can comprise an activity such as swiping a customer loyalty card at a networked kiosk in a brick-and-mortar store to accumulate frequent visitor points through the store's loyalty program. In some cases, a network or system, such as an event relay system 160 can relay notification of an entry event via a network, such as network 170 or through a networked system, such as, but not limited to, an conversion timing system 100, a content provider 110, a direct measurement system 130 and a campaign operations system 150.

In some embodiments, the conversion timing system 100 can receive histories which document events comprising entry events, conversion events or combinations thereof; the conversion timing system may examine the histories to determine conversion timespans, elapsed times or both. In some cases, one or more systems which can be operated or maintained by different business entities may provide histories to the conversion timing system; for example, one or more direct measurement systems, advertising exchange systems, campaign operations systems or combinations thereof may provide histories. In some cases, histories can be provided to the conversion timing system from entities, parties, content providers or advertisers.

Modeling system 102 constructs a conversion timing model based on a distribution of conversion timespans for a population of converters. A conversion timespan describes a length of time between a qualified entry event and a conversion event for a converted entity. The conversion timing model is configured to predict a likelihood of conversion for an entity based on an elapsed time since a qualified entry event executed by the entity.

Figure 2A:
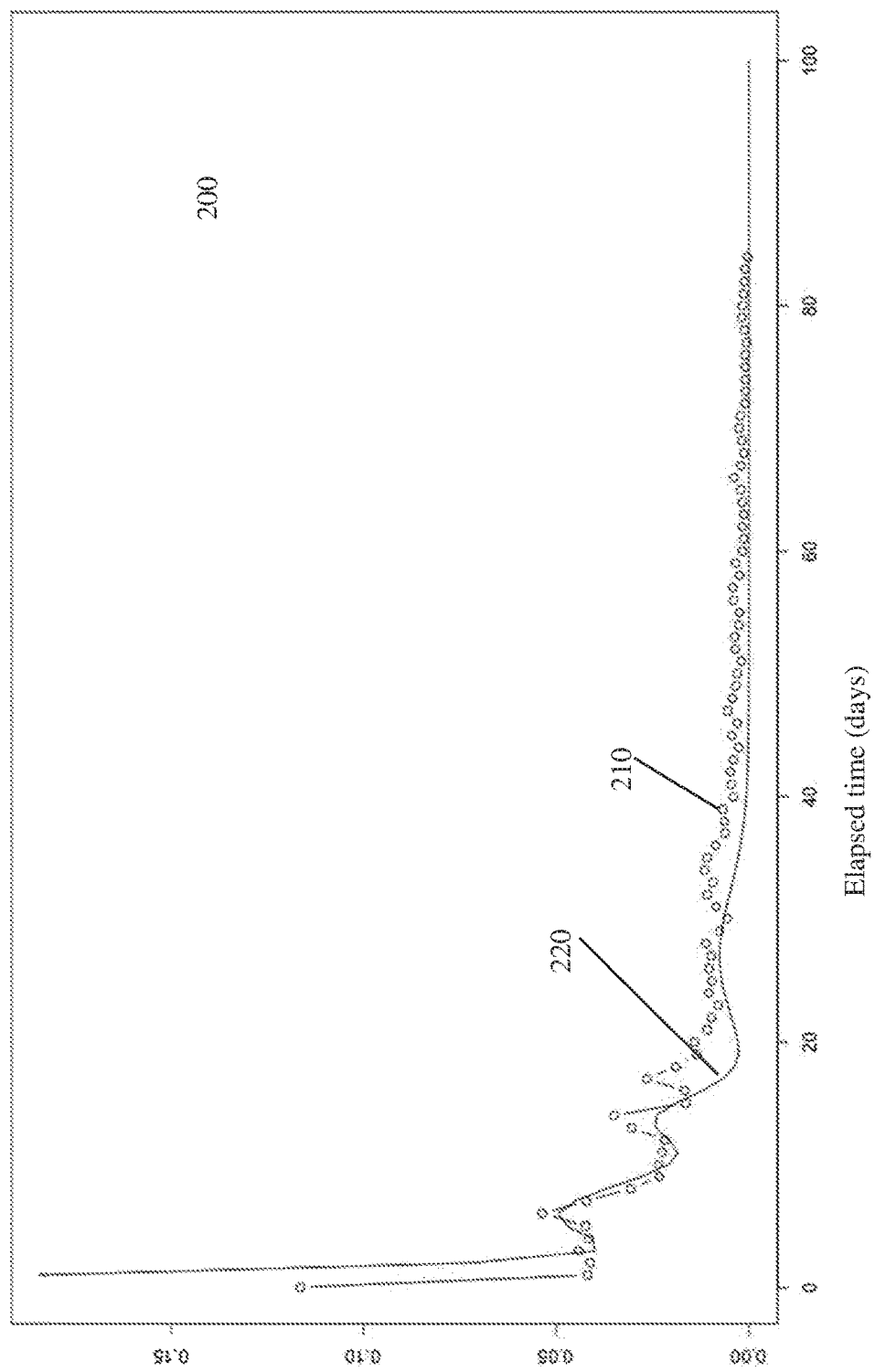
FIG. 2a illustrates an example of a distribution of conversion timespans for a population of converters and an example of a model constructed from that distribution using a mixture of gamma distributions.

In an example, a conversion timespan may be represented with the length of time between a qualified entry event and a conversion event for a converted entity. FIG. 2a illustrates an example of a distribution of conversion timespans for a population of converters and an example of a model 220 constructed from that distribution. In this example, the conversion timespans have been sorted into time buckets which are one hour wide; each open circle 210 represents the count of conversion timespans which fell within a one hour time bucket. The conversion timing model 220 has been constructed using bucketed timespans. In other cases, the conversion timing model may be constructed using individual timespan values.

A variety of modeling techniques may be used to construct a conversion timing model. In an embodiment, the conversion timing system fits the distribution of conversion timespans with a gamma mixture model, with the conversion timespans treated like waiting times. A typical elapsed time between a qualified entry event and a conversion event may be different for different categories of converters. For example, impulse buyers, loyal long-time customers and bargain shoppers may have different purchasing patterns or conversion modes. In another example, converters may be categorized by patterns in the time or day, day or week or seasonality of their purchases; for example, some converters may typically make purchases during the weekend days, while others may typically make purchases during weekday evenings. A gamma mixture model may be fitted with a pre-configured number of conversion modes or fitted with a number of conversion modes received from an external resource; a conversion mode may map to a converter category. In some cases, multiple gamma mixture models may be fitted using different numbers of conversion modes and the gamma mixture model with the best fit may be selected for operation. Advantageously, the number of conversion modes which provides the best fit may provide insight to the advertiser by characterizing the number of different types of converters.

Figure 2B:
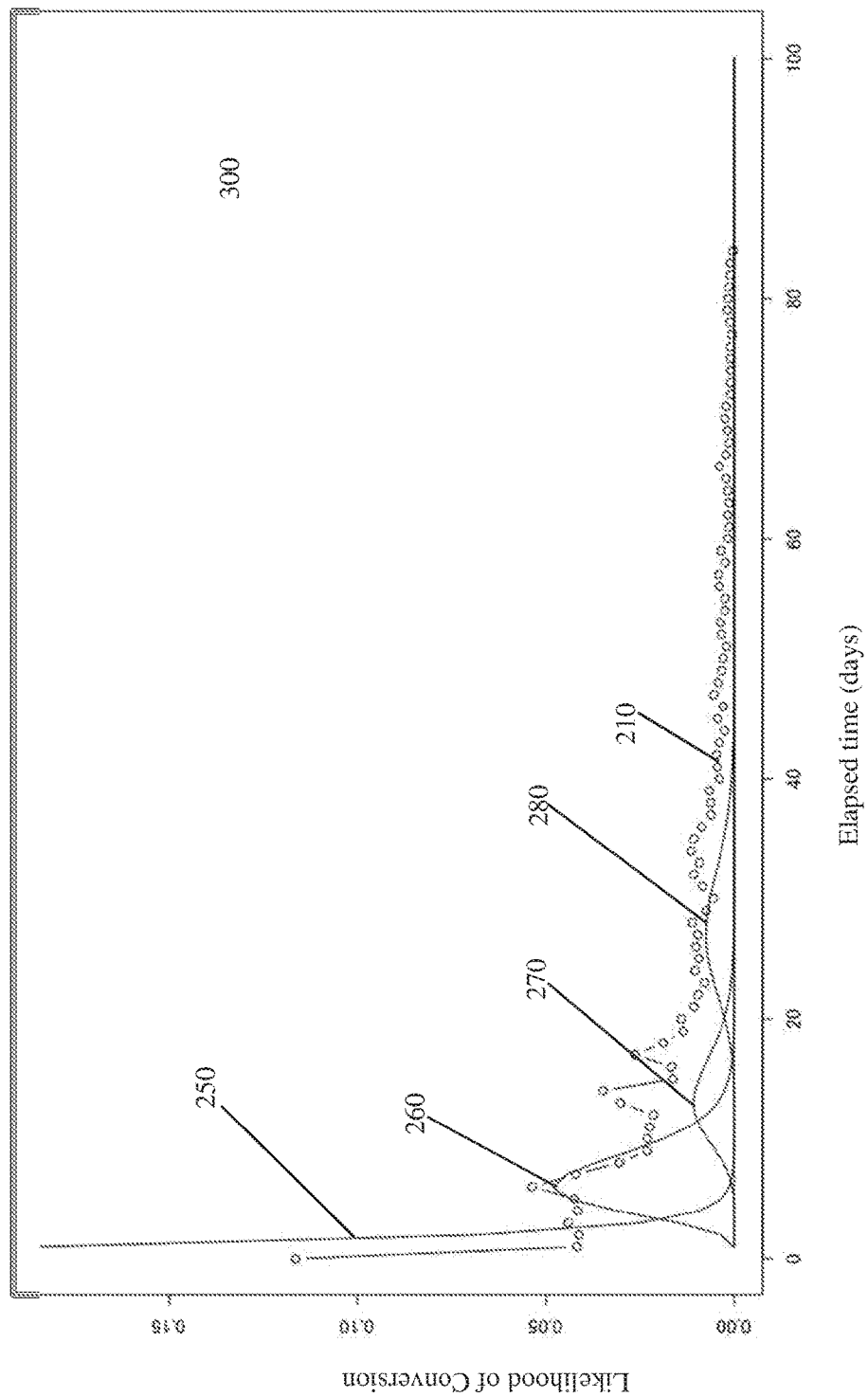
FIG. 2b illustrates an example of a distribution of conversion timespans for a population of converters and four weighted gamma distributions, each representing a different conversion mode.

Fitting a gamma mixture model may include weighting each of the gamma models to achieve a good fit to the data. The weighting of a gamma model representing a conversion mode can be interpreted as the portion of the conversion mode represented in the population of converters. FIG. 2b illustrates an example of the four weighted gamma distributions which were used fit to the data 210. In this example, gamma distribution 250 models a distribution of converters which strongly represents converters which convert rapidly with a conversion timespan of one day or less, and it has been given a relative weight of 0.5, meaning that this gamma distribution represents a conversion mode which accounts for 50% of the converters. Gamma distribution 260 models a distribution of converters which strongly represents converters which convert with a conversion timespan on the order of seven days, and it has been given a relative weight of 0.3, meaning that this gamma distribution represents a conversion mode which accounts for 30% of the converters. Gamma distribution 270 models a distribution of converters which strongly represents converters which convert with a conversion timespan on the order of fourteen days, and it has been given a relative weight of 0.1, meaning that this gamma distribution represents a conversion mode which accounts for 10% of the converters. Gamma distribution 280 models a distribution of converters which strongly represents converters which convert with a conversion timespan on the order of twenty-eight days, and it has been given a relative weight of 0.1, meaning that this gamma distribution represents a conversion mode which accounts for 10% of the converters.

In an example, the conversion timing model can be configured to predict a likelihood of conversion at a point in time or within a time window. For example, a party may want to know what the likelihood of conversion is at the moment the notification is received, one hour from the moment the notification is received or both. Referring to FIG. 2a, the likelihood of conversion at a point in time may be estimated by locating a point on curve 220.

In some cases, a party may want to know the likelihood of conversion within a time window such as the likelihood of conversion within the next hour or next day; to address this case, the conversion timing model can be configured to predict a likelihood of conversion within a time window. Similarly, a party may want to know the likelihood of conversion for a time window in the future, such as the likelihood of conversion between tomorrow and the day after tomorrow. Referring to FIG. 2a, the likelihood of conversion for a time window may be estimated by integrating the area under a portion of the curve 220.

In some cases, the likelihood of conversion can be represented as a category such as low likelihood of conversion, moderate likelihood of conversion or high likelihood of conversion, with respect to a point in time or within a time window. In some cases, the conversion timing system 100 may determine categories, with ranges of values for likelihood of conversion. In some cases, the categories, with ranges of values, may be provided to the conversion timing system 100; in some cases, the number of categories may be provided to the conversion timing system 100 and the conversion timing system 100 may determine suitable ranges of values for likelihood of conversion for each category. The response to the notification can be prepared by the conversion timing system 100 to include the likelihood of conversion category.

Conversion timing system 100 can be configured to use a conversion timing model to predict trends related to the likelihood of conversion. For example, the likelihood of conversion at a moment in time or for a time window may be estimated using a conversion timing model as previously described. In addition, the trend for the likelihood of conversion over a trending time period may also be estimated from a conversion timing model. Examples of trends include "rising over the next day", "falling between noon and 3:00 PM today" and "substantially stable over the next week." In some cases, trending information and the likelihood of conversion for a candidate entity may be combined in a category which describes both. For example, a category may indicate that the likelihood of conversion is moderate at a point in time, but rising over the next week; another category may indicate that the likelihood of conversion is high during a time window, but falling between noon and 3:00 PM that day.

Modeling system 102 constructs a conversion timing model based on a distribution of conversion timespans for a population of converters. In some cases, additional information may be available to the modeling system 102, such as, but not limited to, information related to a converter. For example, information related to the converter's media consumption history, ad exposure history, purchasing history or combinations thereof may be made available to the modeling system 102. In some cases, known or inferred geographic, sociographic, psychographic and/or demographic information may be made available to the modeling system 102. In some cases, additional information related to a conversion may be made available to the modeling system 102, such as typical trends for an industry related to time-of-day, day-of-week or seasonality of conversions. With access to additional information, the modeling system 102 may construct a parameterized conversion timing model.

In an example, additional information may be used to adjust the selection of the gamma distributions which are incorporated into the gamma mixture model, the relative weighting of the gamma distributions used in the gamma mixture model or combinations thereof.

A notification manager 104 receives notification of an opportunity to expose a candidate entity to networked content. For example, the notification may comprise a bid opportunity received from an advertising exchange system 140, such as a real time bidding exchange (RTB). In another example, the notification may comprise a message from a content provider 110 seeking information which can be used to inform content customization, advertisement selection by the content provider 110 or advertising content selection. The notification is associated with a timestamp. The notification's timestamp may be received by the conversion timing system 100 in conjunction with the notification; in some examples, the timestamp may be assigned by the conversion timing system 100. In some cases, the timestamp may be expressed using a known time zone, such as GMT, or expressed in elapsed time relative to a time origin, such as UNIX® time. In some cases, it may be necessary for the conversion timing system 100 to convert a timestamp to a common time standard for consistency.

The notification manager 104 identifies a qualified entry event for the candidate entity, according to one or more entry event criteria. As previously discussed, the conversion timing model may be constructed using elapsed times with respect to entry events which are qualified according to one or more entry event criteria; for accuracy, the notification manager can operate using the same entry event criteria to assess the elapsed time for a candidate entity. However, in some cases, the notification manager and the modeling system 102 may use different sets of entry event criteria. For example, a conversion timing model may be constructed based on events with coarse time-stamps, and the modeling system may operate using an entry event criteria including a limitation expressed in terms of a low resolution time-stamp. However, the notification manager 104 may receive notifications which are associated with a precise time measurement, and an entry event criteria applied by the notification manager 104 may be expressed in terms of a high resolution time-stamp. In another example, the entry event criteria used for construction of the conversion timing model may be specific to the conversions used to generate the model and the entry event criteria may be updated or abstracted for use by the notification manager to assess a candidate entity's entry event.

A candidate entity's qualified entry event is associated with an approximate or exact time that the qualified entry event occurred, enabling the determination of an elapsed time since a qualified entry event. In some cases, a candidate's qualified entry event may be associated with a timestamp expressed using a known time zone, such as GMT, or expressed in a length of time relative to a time origin, such as UNIX® time. In some cases, it can be necessary to convert a timestamp to a common time standard for consistency. In some cases, the response system 106 can also access a partial or complete media consumption history for a candidate entity to determine a timestamp for a quantified entry event. The elapsed time can be determined by assessing the time elapsed between a timestamp associated with a notification related to a candidate entity and a timestamp associated with a qualified entry event for the candidate entity.

Response system 106 receives a conversion timing model from the modeling system 102 and an elapsed time for a candidate entity from the notification manager, and predicts a likelihood of conversion for the candidate entity by applying the conversion timing model to the elapsed time. A response to the notification is prepared based on the likelihood of conversion before the notification's opportunity to expose the candidate entity to networked content is consumed. In some cases, the response can comprise the value of the likelihood of conversion at a point in time, within a time window or both. In some cases, the response system 106 may take steps to process the likelihood of conversion into one or more useful parameters such as, but not limited to, a suggested bid value, suggested custom content, suggested ad content, suggested ad category and estimated funnel stage. The response may be provided to systems such as, but not limited to, a content provider, an advertising exchange system, an advertising content server, and a campaign operations system.

In an example, the conversion timing system 100 can be integrated with systems that provide information such as event histories, enabling it to receive information and consistently associate the information with the correct entity. For example, a direct measurement system may be integrated with the conversion timing system. For example, content providers can redirect an entity to submit a pixel request to a direct measurement system as previously described. For example, the pixel request can be a request for a redirection script from the direct measurement system. After receiving a pixel request from the entity, the direct measurement system 130 may generate an anonymous identifier which it stores in its data repository 131 in conjunction with the entity consumption history, and also sends back to the entity as a variable in an HTML meta data field; in addition, the direct measurement system can send a redirection script to the entity, which instructs the entity to provide the anonymous identifier to the conversion timing system along with a pixel request to the conversion timing system. This enables the conversion timing system to set or reset a conversion timing system third party cookie at the entity. The conversion timing system can now cross-reference their own cookie or entity identifier with the direct measurement system's anonymous identifier so that the direct measurement system can provide information such as an event history associated with an anonymous identifier, making the information received from the direct measurement system associable with the conversion timing system's entity identifier. This describes just one possible method of integrating with external systems.

In an embodiment, a conversion timing system can comprise internal modules that operate as a direct measurement system, a campaign operations system and/or an advertising exchange system. This can enable the use of the same entity identifier in all internal modules or the ability to easily establish the cross-reference between the different identifiers used by the different internal modules.

Figure 3:
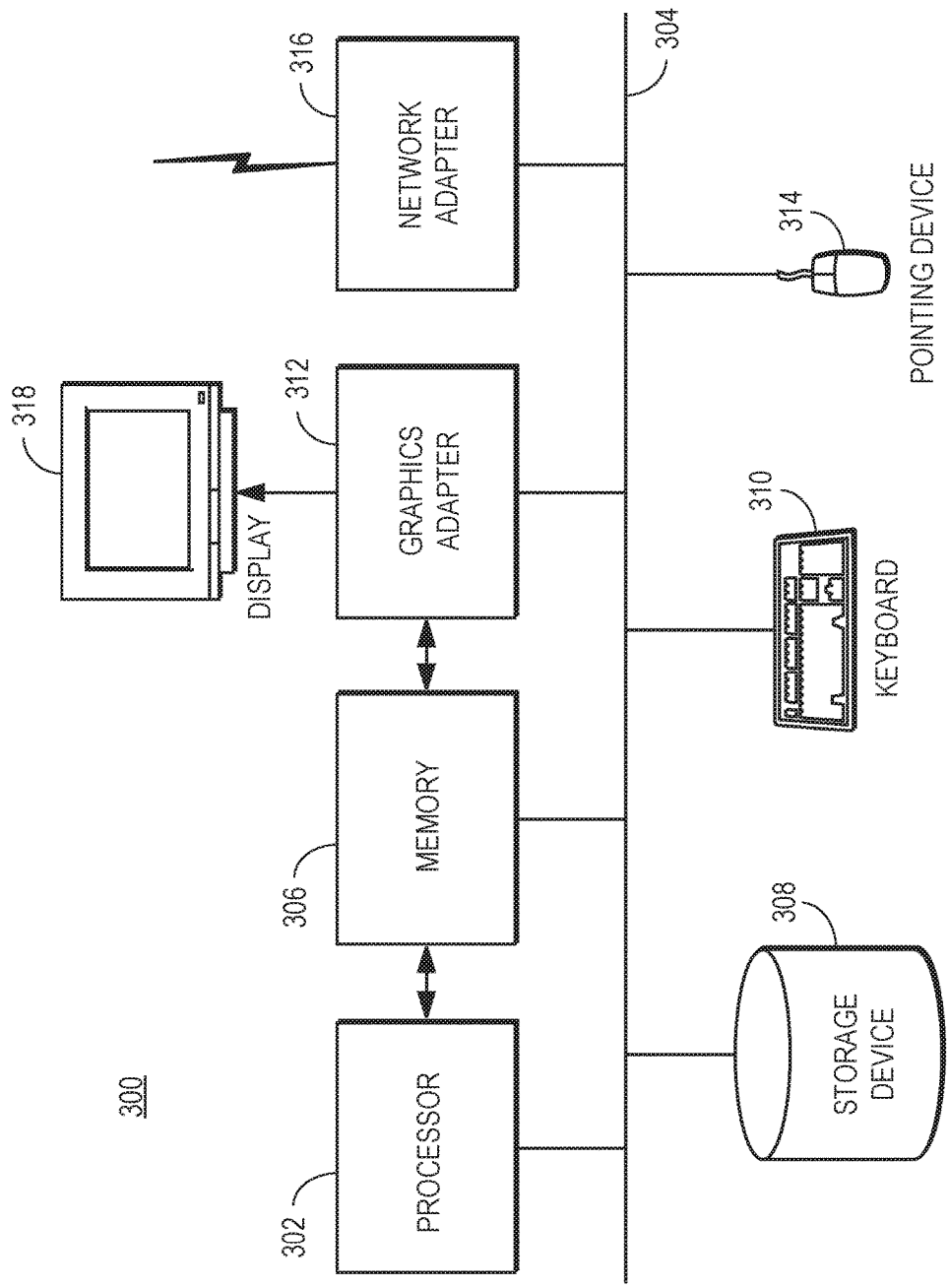
FIG. 3 is a high-level block diagram illustrating an example of a computer for use as a conversion timing system, a content provider, an entity, a direct measurement system, an advertising exchange system, a campaign operations system and/or an event relay system of FIG. 1.

FIG. 3 is a high-level block diagram illustrating an example of a computer for use as a conversion timing system 100, a content provider 110, an entity, a direct measurement system 130, an advertising exchange system 140, a campaign operations system 150 and/or an event relay system 150 of FIG. 1. Illustrated are a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The processor 302 may be any general-purpose processor. The storage device 308 is, in one embodiment, a hard disk drive but can also be any other device capable of storing data, such as a writeable compact disk (CD) or DVD, or a solid-state memory device. The memory 306 may be, for example, firmware, read-only memory (ROM), non-volatile random access memory (NVRAM), and/or RAM, and holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to the network (not shown). In one embodiment, the network is the Internet. The network can also utilize dedicated or private communications links that are not necessarily part of the Internet.

As is known in the art, the computer 300 is adapted to execute computer program modules. As used herein, the term "module" refers to computer program logic and/or data for providing the specified functionality. A module can be implemented in hardware, firmware, and/or software. In one embodiment, the modules are stored on the storage device 308, loaded into the memory 306, and executed by the processor 302. The computer 300 is configured to perform the specific functions and operations by various modules, for example as detailed in FIG. 4 and FIG. 6, and thereby operates as a particular computer under such program control. The types of computers 300 utilized by the entities of FIG. 1 can vary depending upon the embodiment and the processing power utilized by the entity.

FIG. 4 is a flow chart illustrating an example of a method for conversion timing inference according to an embodiment.

A conversion timing model is constructed at a conversion timing system 100 based on a distribution of conversion timespans (Step 410). A conversion timespan describes a length of time between a qualified entry event and a conversion event for a converted entity and wherein the conversion timing model is configured to predict a likelihood of conversion for an entity based on the entity's elapsed time since a qualified entry event. In some cases, the conversion timespans may be sorted into buckets, with each bucket representing a range of timespans, such as timespans ranging between six and seven hours since a qualified entry event.

In some cases, the conversion timing model is constructed in Step 410, by fitting the distribution of conversion timespans with a gamma mixture model. The number of gamma distributions used in generating the gamma mixture model may be received from an external resource. For example, the number of gamma distributions may correspond to the number of conversion modes known or posited by an advertiser. In another example, the number of gamma distributions or conversion modes may be inferred by the conversion timing system 100. In some cases, the conversion timing system 100 may generate multiple gamma mixture models, and the one with the best fit may be selected.

A notification of an opportunity to expose a candidate entity to networked content is received (Step 420). In an example, the notification may be a bid request from a real time bidding exchange (RTB) notifying the conversion timing system 100 that an opportunity to expose a candidate entity to networked advertising content is available for purchase by the highest bidder. In some cases, an entity identifier for the candidate entity, which is the intended recipient of the networked advertising content, may be included in the notification. The candidate entity's entity identifier can enable the conversion timing system 100 to access information related to the candidate entity, such as the candidate entity's history.

In an example, a campaign operations system 150 may manage the interaction with an exchange such as an RTB, and may receive a bid request from an RTB; the campaign operations system 150 may in turn request information from the conversion timing system, thereby notifying the conversion timing system 100 that an opportunity to expose a candidate entity to networked content is available.

An elapsed time since a qualified entry event for the candidate entity is identified (Step 430). In some cases, the conversion timing system 100 may determine the elapsed time since a qualified entry event for a candidate entity. For example, the conversion timing system 100 may access an event history for a candidate entity and determine the elapsed time since a qualified entry event based on one or more received criteria for qualifying an entry event.

A likelihood of conversion for the candidate entity is determined by applying the conversion timing model to the elapsed time since a qualified entry event for the candidate entity (Step 440). In some cases, the likelihood of conversion may be determined for a point in time. In some cases, the likelihood of conversion may be determined for a time window.

A response to the notification is prepared based on the likelihood of conversion for the candidate entity (Step 450). A response can comprise a bid value. In an example, the conversion timing system 100 may receive a bid request and manage the interaction with an advertising exchange system 140. For example, the conversion timing system 100 could request a proposed bid value from a system such as a campaign operations system 150, and then prepare a response by altering the proposed bid value based on the candidate entity's likelihood of conversion. In an example, the response can comprise the selection or suggestion of an advertising creative based on the candidate entity's likelihood of conversion. In another example, the conversion timing system 100 may receive a bid request and relay a prepared response to another system which is responsible for managing the interaction with an advertising exchange system 140.

A response can comprise a bid value. For example, the conversion timing system 100 can receive a notification from a content provider, such as an online clothing vendor or an online news portal seeking to customize the user experience for their visitors. The notification notifies the conversion timing system 100 of the availability of an opportunity to expose a candidate entity to networked content. For example, an online clothing vendor may assume a funnel stage for a prospective customer based on the likelihood of conversion based on an elapsed time, as estimated by the conversion timing system 100. When a prospective customer requests content from the online clothing vendor, as they would when browsing the website of the online clothing vendor, the online clothing vendor may notify the conversion timing system 100 of the opportunity to expose a candidate entity to networked content by requesting a measure or category of the likelihood of conversion based on the elapsed time, and then choose to expose the prospective customer to customized content, an advertisement, a special offer or combinations thereof which can be tuned to the presumed funnel stage of the prospective customer, based on the response from the conversion timing system 100. In an example, the notification is provided to the conversion timing system 100 after the opportunity to expose a candidate entity to networked content becomes available, and the response is provided before the opportunity is consumed.

The conversion path to a conversion event for a prospective customer may include multiple events. For example, before purchasing a product, a customer may read an online article about the product, operate a search engine with keywords that indicate the customer is seeking reviews of the product, operate a search engine with keywords that indicate the customer is seeking a vendor for the product, visit the website for the manufacturer of the product, visit the website for a vendor of the product, visit a specific page on the product vendor's website, or combinations thereof. In an embodiment, the conversion paths of a set of converters may be analyzed by the conversion timing system 100 to produce a conversion timing model for predicting a candidate entity's likelihood of conversion based on the candidate entity's history. The descriptions for a set of two or more qualified funnel events are configured. A qualified funnel event is an event which indicates that a prospective customer is somewhere in the advertiser's funnel. In some cases, a qualified funnel event may be a qualified entry event. In some cases, a qualified entry event may comprise two or more qualified entry events taken together.

FIG. 5a is a table illustrating seven funnel states for a funnel which is modeled with three funnel events where the order of the funnel events in an entity's history is not considered. For FIG. 5a, "+" in the table indicates that the event is found in the entity's consumption history; a "−" in the table indicates that the event is not found in the entity's consumption history. FIG. 5B is a table illustrating fifteen funnel states for a funnel which is modeled with three funnel events where the order of the funnel events in an entity's history is considered. For FIG. 5b, a number (1, 2 or 3) indicates that the event can be found in the entity's consumption history and the value of the number indicates the order in which the event occurred with respect to the other funnel events; for example, a "1" indicates the oldest funnel event and a "3" indicates the most recent funnel event. A "−" in the table indicates that the event is not found in the entity's consumption history.

In an example, the conversion timing system 100 may produce a separate conversion timing model for each funnel state associated with a funnel. The conversion timing model for one funnel state would use the funnel state description for each funnel state to establish the qualifying criteria for the funnel state's qualified entry event. For example, a qualified entry event for a conversion timing model for the funnel state described by funnel state identifier ABC would require a converted entity to have event A, event B and event C in their history; the conversion timespan could be measured from the time the last required event occurred and the time of the conversion event. Similarly, a qualified entry event for a conversion timing model for funnel stage identifier A→C→B for the funnel described n FIG. 5B would require a converted entity to have event A, event C and event B in their history, in that relative order; the conversion timespan could be measured from the time the last required event (in this case, event B) occurred and the time of the conversion event. However, it is understood that other consistent methods can be developed to consistently measure conversion timespans.

For an example where the conversion timing system 100 produces a separate conversion timing model for each funnel state, the conversion timing system must select the proper conversion timing model to apply to a candidate entity in order to estimate a likelihood of conversion based on the elapsed time. In this case, the funnel state of the candidate entity can be determined by examining the candidate entity's history, and the conversion timing model which corresponds to that funnel state can be selected. For example, referring to the funnel described by FIG. 5a, if a candidate entity's history includes event A, event B and event C, then conversion timing model corresponding to funnel stage identifier ABC may be selected and applied to the candidate entity's elapsed time.

FIG. 6 is a flow chart illustrating an example of a method for conversion timing inference according to an embodiment.

Converted entities are sorted into funnel states based on the definition of an entry event for each funnel state (Step 610). The entry event for a funnel state comprises one or more qualified funnel events. In some cases, additional details such as the timing and/or sequence of the entry events may also be specified. For a converter, the funnel state describes the history of the converter prior to conversion. Like the previously described qualified entry events, there may be additional requirements.

A conversion timing model is constructed at a conversion timing system 100 for each funnel state based on the distribution of conversion timespans for the funnel states's converted entities (Step 620). A conversion timespan describes a length of time between a qualified entry event and a conversion event for a converted entity and wherein the conversion timing model is configured to predict a likelihood of conversion for an entity based on the entity's elapsed time since a qualified entry event.

A notification of an opportunity to expose a candidate entity to networked content is received (Step 630). In an example, the notification may be a bid request from a real time bidding exchange (RTB) notifying the conversion timing system 100 that an opportunity to expose a candidate entity to networked advertising content is available for purchase by the highest bidder. In some cases, an entity identifier for the candidate entity, which is the intended recipient of the networked advertising content, may be included in the notification. The candidate entity's entity identifier can enable the conversion timing system 100 to access information related to the candidate entity, such as the candidate entity's history.

The candidate entity can be matched with a funnel state (Step 640). For example, the selection of a funnel state can be based on the presence of qualified funnel events in the candidate entity's history. In some cases, a candidate entity may be matched with two or more funnel states. In some cases, only one of the funnel states will be selected for a match. In an example, the most restrictive funnel state may be selected. For example, a candidate entity's history may match the funnel stages corresponding to A, AB and ABC for the funnel described in FIG. 5A. In this case, the most restrictive funnel state is ABC and it may be selected for a match because it has the most requirements.

An elapsed time since a qualified entry event for the candidate entity is identified (Step 650). In some cases, the conversion timing system 100 may determine the elapsed time since a qualified entry event for a candidate entity. For example, the conversion timing system 100 may access an event history for a candidate entity and determine the elapsed time since a qualified entry event based on one or more received criteria for qualifying an entry event. As previously mentioned, when a qualified entry event comprises two or more entry events, there are various methods that can be used to identify the elapsed time. A method should be selected and applied consistently for the best results.

A likelihood of conversion for the candidate entity is determined by applying the matching funnel state conversion timing model to the elapsed time (Step 660). In some cases, the likelihood of conversion may be determined for a point in time. In some cases, the likelihood of conversion may be determined for a time window.

A response to the notification is prepared based on the likelihood of conversion for the candidate entity (Step 670).

In an example, the conversion timing system 100 may produce one conversion timing model which addresses multiple funnel states associated with a funnel. In this example, multiple funnel states may be associated with a single funnel, as illustrated in FIG. 5*a* and FIG. 5*b*. Each funnel state may be modeled with a weighted mixture of gamma distributions, with each gamma distribution having a scale and shape. In an example, the total number of independent gamma functions used to model the funnel states may be reduced to a target number of modes. As the number of independent gamma functions used to model the funnel states shrinks, the goodness of fit to the distribution of conversion timespans for the population of converters is expected to suffer; however, this technique can reduce the chances of over-fitting the data, and may improve the predictive quality of the resulting models. In some cases, the final number of gamma distributions used to model the funnel states for the conversion timing model, is pre-configured and corresponds to the number of different conversion modes. For the conversion timing model, each funnel state is fitted with a weighted combination of gamma distributions (i.e. gamma mixture model) selected from the same set of gamma distributions each modeling a conversion mode. The overall conversion timing model which addresses multiple funnel states can simply be a set of gamma mixture models sharing the same gamma distribution components but with different weight vectors with each weight vector corresponding to one funnel state model. To further reduce the model parameter size, we can use simple forms of parameterized functions (such as a linear function) to map from the observed funnel events directly to the weight vectors, instead of explicitly defining disjoint funnel states based on funnel events as in FIG. 5*a* and FIG. 5*b*. It is straightforward to find the optimal parameters (scale and shape for the gamma distributions, and weight vector corresponding to funnel states) for the model using standard optimization algorithms such as expectation-maximization (EM) algorithm. The number of gamma distribution components (number of modes) can also be systematically determined using standard model selection methodologies.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A computer-implemented method comprising:
receiving, from a data repository, histories of a plurality of converted entities, each history comprising records of events associated with a respective converted entity;
calculating a respective conversion timespan for each converted entity, the respective conversion timespan comprising a time difference between an entry event of the respective converted entity and a conversion event of the respective converted entity;
fitting a conversion timing model to a distribution of the calculated conversion timespans, wherein the conversion timing model is configured to predict, from an elapsed time since an entry event of an entity, a likelihood of conversion for the entity;
receiving, from a real time bidding exchange, notification of an opportunity to bid on an advertising exposure associated with a candidate entity;
responsive to receiving notification of the opportunity to bid, predicting a likelihood of conversion for the candidate entity by applying the conversion timing model to an elapsed time since an entry event of the candidate entity;
and
preparing a response to the notification, the response comprising a bid price determined from the predicted likelihood of conversion for the candidate entity.

2. The method of claim 1 further comprising:
sending the prepared response to the exchange.

3. The method of claim 1 wherein:
predicting a likelihood of conversion comprises predicting a likelihood of conversion within a time window.

4. The method of claim 1 wherein:
fitting comprises fitting the distribution of calculated conversion timespans with a gamma mixture model configured with a number of conversion modes.

5. The method of claim 1 wherein:
preparing a response comprises selecting an advertising creative according to the predicted likelihood of conversion.

6. The method of claim 5 further comprising:
sending the selected advertising creative to the candidate entity.

7. The method of claim 1 wherein:
preparing comprises customizing content.

8. A system comprising:
a processor; and
a computer readable storage medium storing processor-executable computer program instructions, the instructions comprising instructions for:
receiving, from a data repository, histories of a plurality of converted entities, each history comprising records of events associated with a respective converted entity;
calculating a respective conversion timespan for each converted entity, the respective conversion timespan comprising a time difference between an entry event of the respective converted entity and a conversion event of the respective converted entity;

fitting a conversion timing model to a distribution of the calculated conversion timespans, wherein the conversion timing model is configured to predict, from an elapsed time since an entry event of an entity, a likelihood of conversion for the entity;

receiving, from a real time bidding exchange, notification of an opportunity to bid on an advertising exposure associated with a candidate entity;

responsive to receiving notification of the opportunity to bid, predicting a likelihood of conversion for the candidate entity by applying the conversion timing model to an elapsed time since an entry event of the candidate entity;

and preparing a response to the notification, the response comprising a bid price determined from the predicted likelihood of conversion for the candidate entity.

9. The system of claim 8 wherein the instructions further comprise:

sending the prepared response to the exchange.

10. The system of claim 8 wherein:

predicting a likelihood of conversion comprises predicting a likelihood of conversion within a time window.

11. The system of claim 8 wherein:

fitting comprises fitting the distribution of calculated conversion timespans with a gamma mixture model configured with a number of conversion modes.

12. The system of claim 8 wherein:

preparing a response comprises selecting an advertising creative according to the predicted likelihood of conversion.

13. The system of claim 12 wherein the instructions further comprise:

sending the selected advertising creative to the candidate entity.

14. The system of claim 8 wherein:

preparing comprises customizing content.

15. A non-transitory computer readable storage medium executing computer program instructions, the computer program instructions comprising instructions for:

receiving, from a data repository, histories of a plurality of converted entities, each history comprising records of events associated with a respective converted entity;

calculating a respective conversion timespan for each converted entity, the respective conversion timespan comprising a time difference between an entry event of the respective converted entity and a conversion event of the respective converted entity;

fitting a conversion timing model to a distribution of the calculated conversion timespans, wherein the conversion timing model is configured to predict, from an elapsed time since an entry event of an entity, a likelihood of conversion for the entity;

receiving, from a real time bidding exchange, notification of an opportunity to bid on an advertising exposure associated with a candidate entity;

responsive to receiving notification of the opportunity to bid, predicting a likelihood of conversion for the candidate entity by applying the conversion timing model to an elapsed time since an entry event of the candidate entity;

and preparing a response to the notification, the response comprising a bid price determined from the predicted likelihood of conversion for the candidate entity.

16. The medium of claim 15, the instructions further comprising:

sending the prepared response to the exchange.

17. The medium of claim 15 wherein:

predicting a likelihood of conversion comprises predicting a likelihood of conversion within a time window.

18. The medium of claim 15 wherein:

fitting comprises fitting the distribution of calculated conversion timespans with a gamma mixture model configured with a number of conversion modes.

19. The medium of claim 15 wherein:

preparing a response comprises selecting an advertising creative according to the predicted likelihood of conversion.

20. The medium of claim 19 wherein the instructions further comprise:

sending the selected advertising creative to the candidate entity.

* * * * *